United States Patent
Balakrishnan et al.

(10) Patent No.: US 12,277,322 B2
(45) Date of Patent: Apr. 15, 2025

(54) METHOD OF OPTIMIZING QUALITY OF SERVICE (QOS) IN SOLID-STATE DRIVES (SSDS) AND AN SSD THEREOF

(71) Applicant: SAMSUNG ELECTRONICS CO., LTD., Suwon-si (KR)

(72) Inventors: Suman Prakash Balakrishnan, Bengaluru (IN); Anantha Sharma, Bengaluru (IN); Tushar Tukaram Patil, Bengaluru (IN); Rakesh Balakrishnan, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 18/076,686

(22) Filed: Dec. 7, 2022

(65) Prior Publication Data

US 2024/0111422 A1 Apr. 4, 2024

(30) Foreign Application Priority Data

Sep. 30, 2022 (IN) .............................. 202241056374

(51) Int. Cl.
*G06F 3/00* (2006.01)
*G06F 3/06* (2006.01)
*G06F 12/00* (2006.01)

(52) U.S. Cl.
CPC ............ *G06F 3/0611* (2013.01); *G06F 3/064* (2013.01); *G06F 3/0652* (2013.01); *G06F 3/0679* (2013.01)

(58) Field of Classification Search
CPC ...... G06F 3/0611; G06F 3/064; G06F 3/0652; G06F 3/0679

USPC ......................................................... 711/103
See application file for complete search history.

(56) References Cited

U.S. PATENT DOCUMENTS

| | | | |
|---|---|---|---|
| 6,266,671 B1* | 7/2001 | Niimura | G06F 3/0608 |
| 7,856,528 B1* | 12/2010 | Frost | G06F 3/0644 |
| | | | 711/170 |
| 9,286,002 B1* | 3/2016 | Karamcheti | G06F 11/1096 |
| 10,552,058 B1* | 2/2020 | Jadon | G06F 3/0647 |
| 10,552,085 B1* | 2/2020 | Chen | G06F 3/061 |
| 10,915,400 B1* | 2/2021 | Muchherla | G06F 9/5022 |
| 11,175,984 B1* | 11/2021 | Lercari | G06F 11/0784 |

(Continued)

FOREIGN PATENT DOCUMENTS

EP 2 939 100 A2 11/2015

OTHER PUBLICATIONS

European Extended Search Report issued Sep. 8, 2023 by the European Patent Office for EP Patent Application No. 23153559.2.

(Continued)

*Primary Examiner* — Sheng Jen Tsai
(74) *Attorney, Agent, or Firm* — Sughrue Mion, PLLC

(57) ABSTRACT

A method of operating a solid state drive (SSD) is provided. The method includes generating, by a controller provided in the SSD, a free block list indicating a plurality of free super blocks, wherein adjacent free super blocks of the plurality of free super blocks correspond to different dies of a plurality of dies provided in the SSD; and allocating, by the controller, a free super block from among the plurality of free super blocks indicated by the free block list for each of a host write operation and a garbage collection write operation, according to a sequence of the plurality of free super blocks indicated by the free block list.

18 Claims, 9 Drawing Sheets

(56) References Cited

U.S. PATENT DOCUMENTS

| | | | |
|---|---|---|---|
| 11,416,413 B1* | 8/2022 | Lercari | G06F 3/064 |
| 11,487,657 B1* | 11/2022 | Kuzmin | G06F 3/0659 |
| 11,740,801 B1* | 8/2023 | Kuzmin | G06F 3/0616 |
| | | | 711/103 |
| 2002/0194451 A1* | 12/2002 | Mukaida | G06F 12/0607 |
| | | | 711/E12.079 |
| 2003/0028704 A1* | 2/2003 | Mukaida | G11C 16/08 |
| | | | 711/E12.079 |
| 2009/0172499 A1* | 7/2009 | Olbrich | G06F 3/0604 |
| | | | 714/773 |
| 2009/0327802 A1* | 12/2009 | Fukutomi | G06F 11/1068 |
| | | | 714/6.2 |
| 2010/0299565 A1* | 11/2010 | Muro | G06F 11/1441 |
| | | | 714/E11.062 |
| 2012/0166715 A1* | 6/2012 | Frost | G06F 12/0246 |
| | | | 711/E12.008 |
| 2013/0086304 A1* | 4/2013 | Ogawa | G06F 3/0688 |
| | | | 711/E12.008 |
| 2014/0181532 A1* | 6/2014 | Camp | G06F 21/79 |
| | | | 713/190 |
| 2014/0185376 A1* | 7/2014 | Sinclair | G06F 3/0658 |
| | | | 365/185.03 |
| 2014/0189205 A1* | 7/2014 | Sinclair | G06F 12/0246 |
| | | | 711/103 |
| 2014/0189206 A1* | 7/2014 | Sinclair | G06F 12/0246 |
| | | | 711/103 |
| 2014/0189207 A1* | 7/2014 | Sinclair | G06F 12/0246 |
| | | | 711/103 |
| 2014/0189208 A1* | 7/2014 | Sinclair | G06F 12/0246 |
| | | | 711/103 |
| 2014/0189209 A1* | 7/2014 | Sinclair | G06F 3/065 |
| | | | 711/103 |
| 2014/0189210 A1* | 7/2014 | Sinclair | G06F 12/0246 |
| | | | 711/103 |
| 2014/0281138 A1* | 9/2014 | Karamcheti | G06F 11/2058 |
| | | | 711/160 |
| 2014/0281311 A1* | 9/2014 | Walker | G06F 3/0631 |
| | | | 711/170 |
| 2014/0317337 A1* | 10/2014 | Puthiyedath | G11C 16/3431 |
| | | | 711/103 |
| 2015/0378886 A1* | 12/2015 | Nemazie | G06F 12/0246 |
| | | | 711/103 |
| 2017/0123655 A1* | 5/2017 | Sinclair | G06F 3/061 |
| 2017/0123664 A1* | 5/2017 | Parker | G06F 3/0616 |
| 2017/0123666 A1* | 5/2017 | Sinclair | G06F 3/0604 |
| 2017/0123682 A1* | 5/2017 | Sinclair | G06F 3/0611 |
| 2017/0123726 A1* | 5/2017 | Sinclair | G06F 12/02 |
| 2018/0024897 A1* | 1/2018 | Cai | G06F 11/1666 |
| | | | 714/6.12 |
| 2019/0056989 A1* | 2/2019 | Srinivasan | G11C 16/28 |
| 2019/0087327 A1* | 3/2019 | Kanno | G06F 12/0261 |
| 2019/0087328 A1* | 3/2019 | Kanno | G06F 3/0688 |
| 2019/0172537 A1* | 6/2019 | Peddle | G06F 12/0246 |
| 2019/0294553 A1* | 9/2019 | Gavens | G06F 3/0679 |
| 2020/0125294 A1 | 4/2020 | Parker | |
| 2021/0149594 A1* | 5/2021 | Shah | G11C 16/10 |
| 2021/0149797 A1* | 5/2021 | Kanno | G06F 13/4068 |
| 2021/0200633 A1* | 7/2021 | Liang | G06F 12/1009 |
| 2022/0027233 A1* | 1/2022 | Klein | G06F 3/0656 |
| 2022/0319624 A1* | 10/2022 | Cheng | H03M 13/1111 |
| 2023/0297262 A1* | 9/2023 | Sasaki | G06F 3/0679 |
| | | | 711/154 |

OTHER PUBLICATIONS

Jaeho Kim et al., "Alleviating Garbage Collection Interference through Spatial Separation in All Flash Arrays", Jul. 10-12, 2019, pp. 779-812, (ISBN 978-1-939133-03-8), URL: https://www.usenix.org/conference/atc19/presentation/kim-jaeho.

Jeong-Uk Kang et al., "A Superblock-based Flash Translation Layer for NAND Flash Memory" EMSOFT'06, Oct. 22-25, 2006, pp. 161-170.

Emmanuel Goossaert, "Coding for SSDs—Part 5: Access Patterns and System Optimizations", Code Capsule, Feb. 12, 2014, Total 24 pages, URL: https://codecapsule.com/2014/02/12/coding-for-ssds-part-5-access-patterns-and-system-optimizations/.

* cited by examiner

METHOD OF OPTIMIZING QUALITY OF SERVICE (QOS) IN SOLID-STATE DRIVES (SSDS) AND AN SSD THEREOF

CROSS-REFERENCE TO RELATED APPLICATION

This application claims priority from Indian Patent Application No. 202241056374 filed on Sep. 30, 2022, in the Office of the Controller General of Patents, Designs and Trade Marks, the disclosure of which is incorporated herein by reference in its entirety.

BACKGROUND

The present disclosure relates to Solid State Drives (SSDs), and more particularly to a method and a system for optimizing Quality of Service (QoS) in SSDs by streamlining host and background input/output (I/O) operations to different dies.

In recent years, NAND flash memory-based SSDs have been widely adopted in various applications where high data access speed is needed. SSDs have reduced the traditional read latency from multiple milliseconds to less than 100 microseconds. Due to the increased speed of SSDs, traditional hard disk drive (HDD) interface is no longer suitable for SSD applications.

An SSD is a solid-state storage device that uses integrated circuit assemblies to store data persistently and may use flash memory. Compared to electromechanical drives, SSDs are typically more resistant to physical shock, are quieter, and have quicker access time and lower latency. Further, architecture of SSD includes various sections and subsections. For example, the architecture may include a plurality of channels, wherein each of the plurality of channels includes a plurality of banks or chips, each of the plurality of banks includes a plurality of planes, each of the plurality of planes includes a plurality of dies, each of the plurality of dies includes a plurality of blocks, and each of the plurality of blocks includes a plurality of pages.

An SSD may include NAND flash memory. Flash memory do not have a property of overwrite, so data needs to be erased before new data can be written to the same block. Due to this property, when data stored in a flash block is changed, new data is written to a new flash block. In order to utilize the older blocks, a garbage collection (GC) operation may be performed. The garbage collection operation is a technique for securing usable capacity in the flash memory by copying valid data of a block to a new block and erasing the existing block. The garbage collection creates space in the SSD. However, when a garbage collection write operation is in progress for a die of the SSD and a new host write operation is scheduled simultaneously for the same die, a delay occurs in performing the new host write operation, until the garbage collection write operation is completed. This is due to a clash that occurs when the host operation and garbage collection write operation simultaneously occur in the same die of the SSD. Either of the operations must wait till the other is completed. Therefore, such a clash between the host write operation and the garbage collection write operation causes latency issues in the SSD, which in turn affects the Quality of Service (QoS) parameters. Furthermore, free super blocks in the free block list was in a sequential manner. In some example embodiments, the super block may be a block including all the blocks of a particular level across all the planes and all the banks of a particular level of die. For instance, if there are three dies (namely die 0, die 1 and die 2) including fifty blocks each (namely block 0, block 1, block 2 ... block 149), then the free super blocks of die 0 will be allocated sequentially until all the blocks of the die 0 are exhausted. Upon exhaustion of all the free super blocks in die 0, then the allocation of free super blocks continues sequentially with free super blocks in remaining dies, for example die 1 and die 2. By using this type of arrangement of free super blocks, there is high probability that there will be clashes between a host write operation and a garbage collection write operation on the same die, leading to latency issues that in turn affects the QoS parameters. Therefore, there exists a need to avoid the clash between the host write operation and garbage collection write operation to a maximum extent, in order to provide optimized QoS in SSD.

SUMMARY

According to an aspect of an example embodiment, a method of operating a solid state drive (SSD) is provided. The SSD includes a plurality of channels, each of the plurality of channels includes a plurality of banks, each of the plurality of banks includes a plurality of planes, each of the plurality of planes includes a plurality of dies, each of the plurality of dies includes a plurality of blocks, and each of the plurality of blocks includes a plurality of pages. The method includes: generating, by a controller provided in the SSD, a free block list indicating a plurality of free super blocks, wherein adjacent free super blocks of the plurality of free super blocks correspond to different dies of the plurality of dies; and allocating, by the controller, a free super block from among the plurality of free super blocks indicated by the free block list for each of a host write operation and a garbage collection write operation, according to a sequence of the plurality of free super blocks indicated by the free block list.

According to an aspect of an example embodiment, an SSD includes: a non-volatile memory comprising a plurality of channels, wherein each of the plurality of channels comprises a plurality of banks, each of the plurality of banks comprises a plurality of planes, each of the plurality of planes comprises a plurality of dies, each of the plurality of dies comprises a plurality of blocks, and each of the plurality of blocks comprises a plurality of pages; a controller; and a memory communicatively coupled to the controller, wherein the memory stores instructions, which when executed, are configured to control the controller to: generate a free block list indicating a plurality of free super blocks, wherein adjacent free super blocks of the plurality of free super blocks correspond to different dies of the plurality of dies; and allocate a free super block from among the plurality of free super blocks indicated by the free block list for each of a host write operation and a garbage collection write operation, according to a sequence of the plurality of free super blocks indicated by the free block list.

According to an aspect of an example embodiment, a non-transitory computer readable storage medium stores instructions that when executed by a processor of a solid state drive (SSD), cause the SSD to: generate a free block list indicating a plurality of free super blocks, wherein adjacent free super blocks of the plurality of free super blocks correspond to different dies of a plurality of dies provided in the SSD; and allocate a free super block from among the plurality of free super blocks indicated by the free block list for each of a host write operation and a garbage collection write operation, according to a sequence of the plurality of free super blocks indicated by the free block list.

BRIEF DESCRIPTION OF THE DIAGRAMS

The above and other aspects will be more apparent from the following description of example embodiments taken in conjunction with the accompanying drawings, in which.

DETAILED DESCRIPTION

Figure 1A:
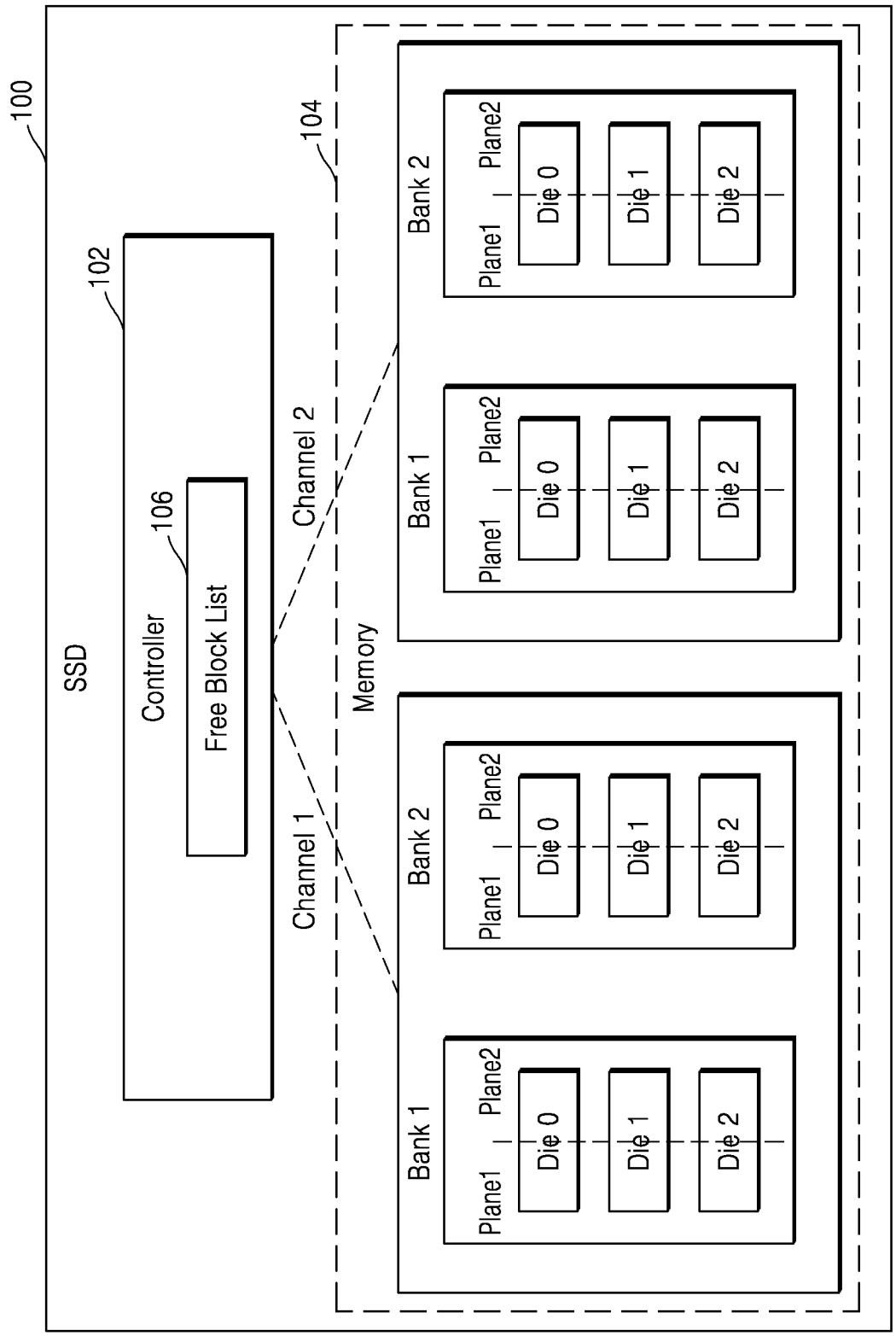
FIG. 1A shows an architecture of a Solid State Drive (SSD) in accordance with some example embodiments.

Hereinafter, example embodiments will be described in detail with reference to the accompanying drawings.

The embodiments described herein are example embodiments, and thus, the present disclosure is not limited thereto, and may be realized in various other forms. Each of the example embodiments provided in the following description is not excluded from being associated with one or more features of another example or another example embodiment also provided herein or not provided herein but consistent with the present disclosure. For example, even if matters described in a specific example or example embodiment are not described in a different example or example embodiment thereto, the matters may be understood as being related to or combined with the different example or example embodiment, unless otherwise mentioned in descriptions thereof. In addition, it should be understood that all descriptions of principles, aspects, examples, and example embodiments of the present disclosure are intended to encompass structural and functional equivalents thereof. In addition, these equivalents should be understood as including not only currently well-known equivalents, but also equivalents to be developed in the future, that is, all devices performing the same functions regardless of the structures thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. Herein, when a term "same" is used to compare a dimension of two or more elements, the term may cover a "substantially same" dimension.

It will be understood that, although the terms first, second, third, fourth etc. may be used herein to describe various elements, these elements should not be limited by these terms. These terms are only used to distinguish one element from another element. Thus, a first element discussed below could be termed a second element without departing from the teachings of the present disclosure.

It will be also understood that, even if a certain step or operation is described later than another step or operation, the step or operation may be performed later than the other step or operation unless the other step or operation is specifically described as being performed after the step or operation.

Disclosed herein are a Solid-State Drives (SSDs) and method for optimizing Quality of Service (QoS) in SSDs. The methods disclosed herein may address the technical problem associated with the latency issues encountered in the SSDs due to the clash that occurs due to simultaneous scheduling of a host write operation and a garbage collection operation within the same die of an SSD. The method may include generating, by a controller (i.e., control circuitry including, for example, transistors, capacitors, logic gates, and other circuit elements to implement certain functionality described in more detail below) configured in the SSD, a free block list indicating a plurality of free super blocks. The free block list generated in the present disclosure works in a manner which is different than the manner in which the free block lists are generated in related techniques. In the present disclosure, each of the plurality of free super blocks that are appended sequentially to the free block list are selected from a different die of a plurality of dies. Thereafter, the method includes allocating a free super block from the plurality of free super blocks in the free block list for each of a host write operation and a garbage collection operation, following sequence of the plurality of free super blocks in the free block list.

According to example embodiments, the free block list is generated based on free super blocks that are appended sequentially from a different die of the plurality of dies in the SSD, rather than from the same die as in related techniques. This ensures that, each time a free super block is allocated by following the sequence of the generated free block list, for the host write operation or the garbage collection write operation, the free super block is allocated to a different die. For instance, if the free super block 1 is from die 0, then the next free super block in the sequence of the generated free block list would be from a different die. For instance, the next free super block i.e., free super block 2 could be from die 1. Therefore, when a host write operation is scheduled, the method includes allocating free super block 1 from die 0 for the host write operation. Simultaneously, or while the host write operation is ongoing, if the SSD schedules a garbage collection write operation, the next free super block in the free block list to be allocated, i.e., free super block 2 from die 1, will be apart from free super block of die 0 which was previously allocated for the host write operation. In this regard, the host write operation is performed in a block of die 0 while the garbage collection write operation is performed in a block of die 1. Hence, there exists no clash between the host write operation and the garbage collection write operation, though both the operations are scheduled simultaneously or while one of those operations is on-going. Therefore, there exists no need to wait for either of the operations to be completed before starting the other operation. This in turn eliminates the latency issues that are encountered in the SSDs due to the clash between the host write operation and garbage collection write operation, thus optimizing the QoS in the SSDs.

A description of an example embodiment with several components in communication with each other does not imply that all such components are required. On the contrary a variety of optional components are described to illustrate the wide variety of possible example embodiments.

In the following detailed description, reference is made to the accompanying drawings. These example embodiments are described in sufficient detail to enable those skilled in the art to practice the disclosure, and it is to be understood that other example embodiments may be utilized, and that changes may be made without departing from the scope of the present disclosure. The following description is, therefore, not to be taken in a limiting sense.

FIG. 1A shows an exemplary architecture of the Solid State Drive (SSDs) in accordance with some example embodiments.

As shown, the SSD 100 includes a controller 102, a memory 104 and a free block list 106. In some example embodiments, the SSD 100 may include a plurality of channels, each of which may direct towards (i.e., communicate with) a plurality of banks of the memory 104. Each of the plurality of banks may include a plurality of planes of the memory 104, each of the plurality of planes may include a plurality of dies of the memory 104, each of the plurality of dies may include a plurality of blocks of the memory 104, and each of the plurality of blocks may include a plurality of pages of the memory 104. FIG. 1A illustrates an SSD 100 that includes two channels, channel 1 and channel 2, that direct towards bank 1 and bank 2 of channel 1 and bank 1 and bank 2 of channel 2. Further, each of the banks includes two planes i.e., plane 1 and plane 2 as shown in the FIG. 1A. Further, each plane includes a plurality of dies such as die 0, die 1 and die 2 as shown in the FIG. 1A. Each die includes multiple blocks and each block includes multiple pages. It is to be noted that, the aforementioned exemplary architecture of SSD 100 as shown in the FIG. 1A is only for illustrative and understanding purpose. However, the number of components and the specific architecture illustrated in the FIG. 1A should be not construed as limiting the present disclosure. Further, the free block list 106 configured in the controller 102 may include one or more free super blocks arranged in a sequential manner. Each of these free super blocks is allocated for functionalities of the SSD 100 such as host write operation, garbage collection operation and the like.

Figure 1B:
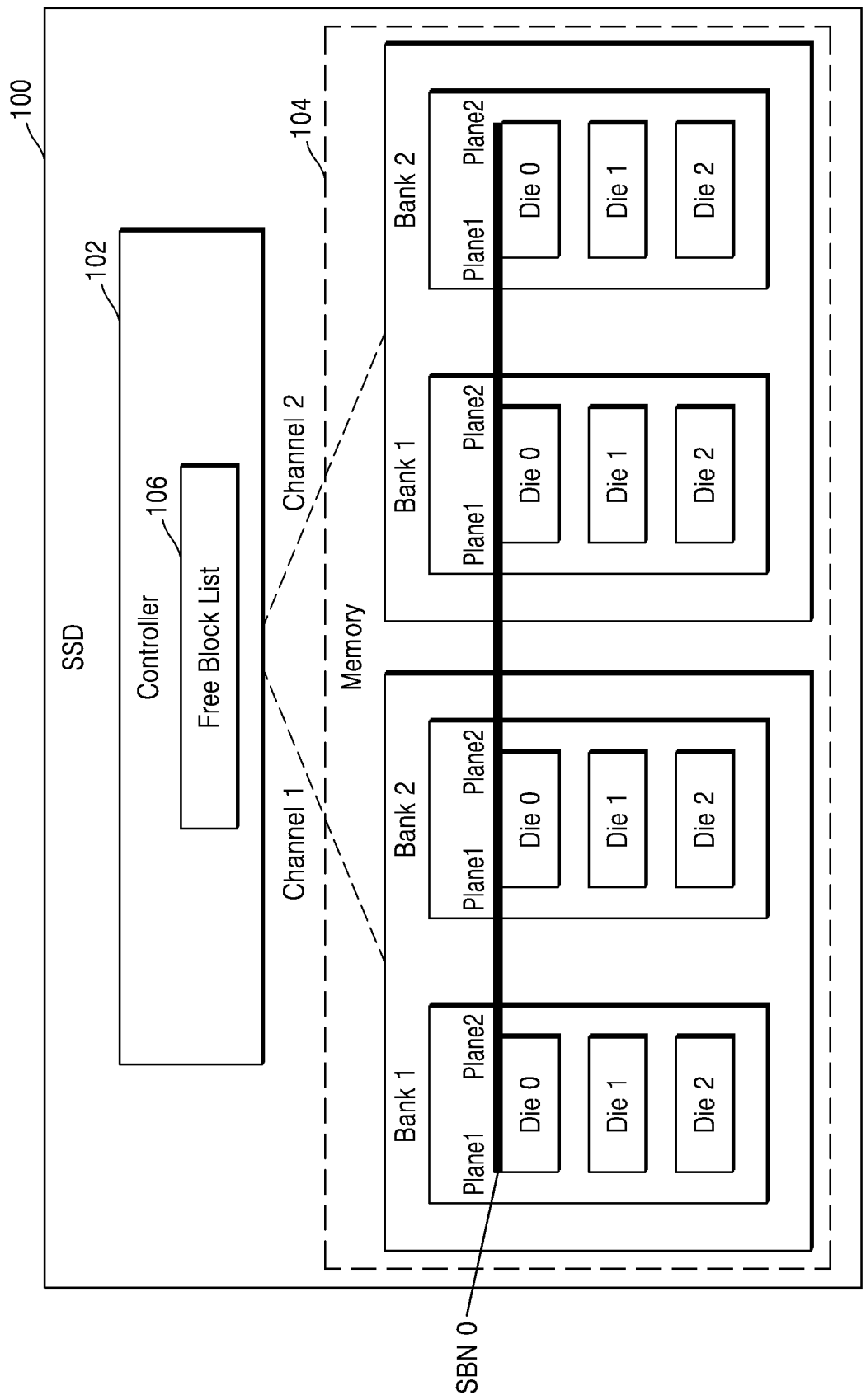
FIGS. 1B and 1C show a super block in the SSD in accordance with some example embodiments.
Figure 1C:
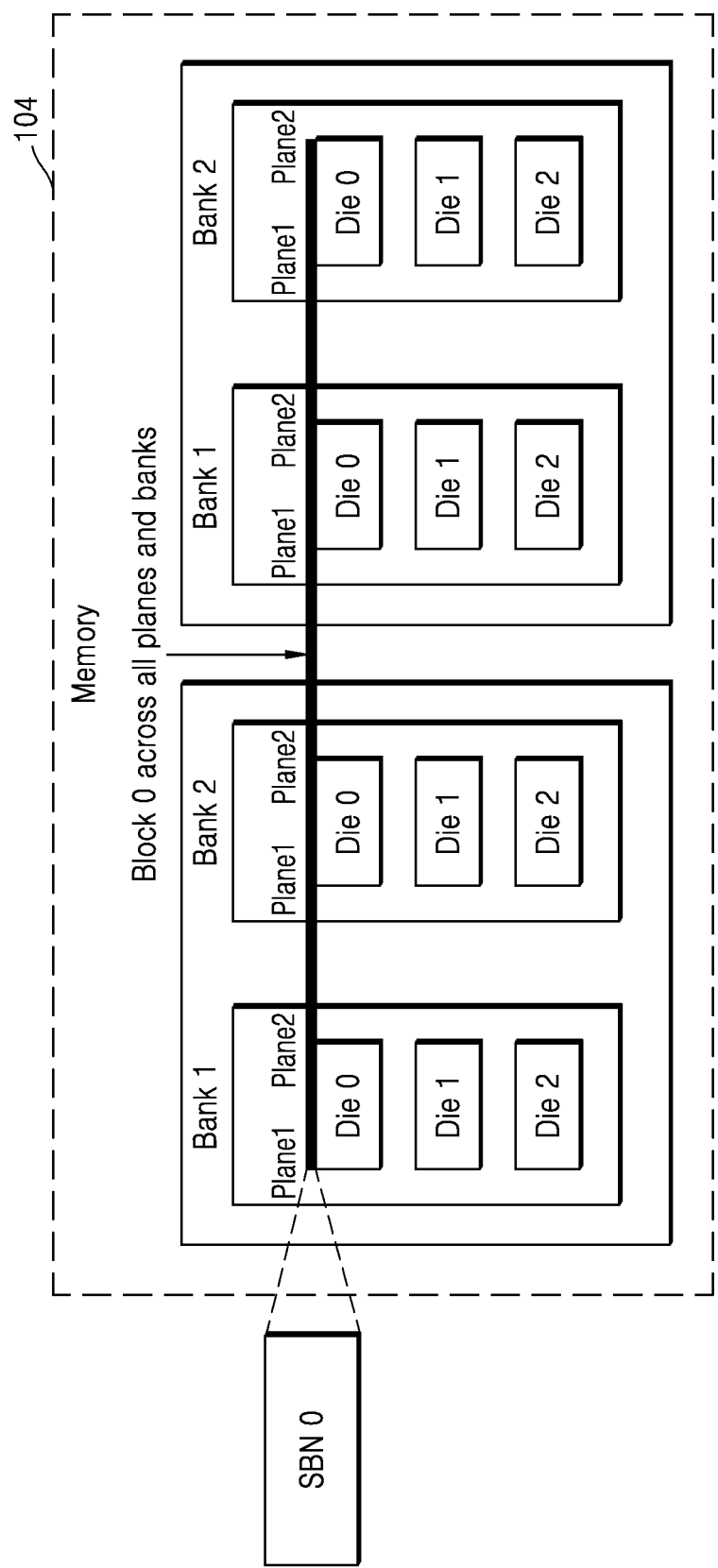

FIGS. 1B and 1C show an exemplary super block within the Solid State Drive (SSDs) in accordance with some example embodiments.

In some example embodiment, the controller 102 may consider a super block for performing any operation related to the SSD 100 such as host write operation, garbage collection operation, host read operation and the like. In some example embodiments, the super block may be a block including all the blocks of a particular level across all the planes and all the banks of a particular level of die. For example, as shown in FIGS. 1B and 1C, SBN 0 represents a super block 0 which includes block 0 of each plane and each bank of a particular level of die i.e., in this instance die 0 of each plane and each bank. Similarly, SBN 1 represents a super block 1 which includes block 1 of each plane and each bank of die 0 of each plane and each bank, and so on.

Figure 2A:
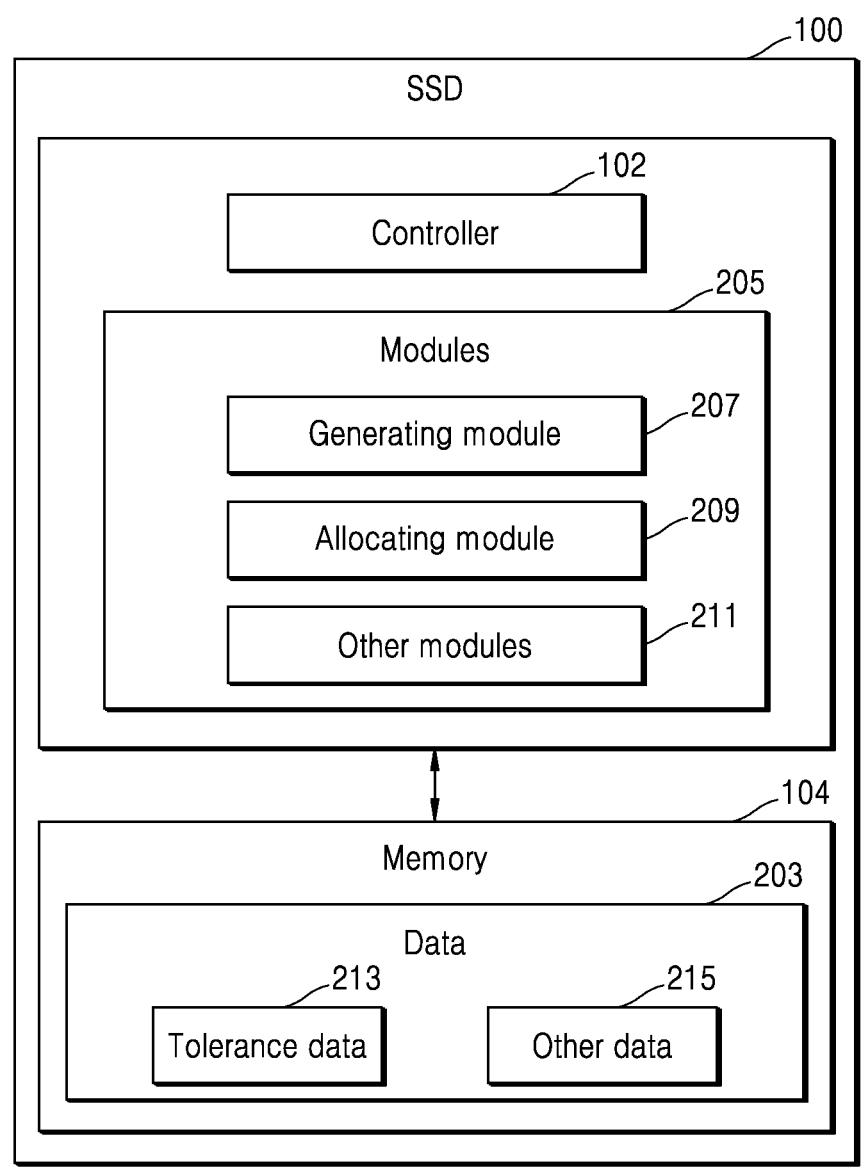
FIG. 2A shows a detailed block diagram of an SSD for optimizing Quality of Service (QoS) in accordance with some example embodiments.

FIG. 2A shows a detailed block diagram of a method for optimizing Quality of Service (QoS) in accordance with some example embodiments.

In some implementations, the SSD 100 may include data 203 and modules 205. As an example, the data 203 is stored in a memory 104 associated with the controller 102. In some example embodiments, the data 203 may include tolerance data 213 and other data 215. In some example embodiments, the modules 205 may be implemented by circuitry within or external to the controller 102, and the circuitry may include transistors, capacitors, logic gates, and other circuit elements to implement certain functionality described in more detail below.

In some example embodiments, the data 203 may be stored in the memory 104 in the form of various data structures. Additionally, the data 203 can be organized using data models, such as relational or hierarchical data models. The other data 215 may be stored data of the SSD 100, including temporary data and temporary files, generated by the modules 205 for performing the various functions of the controller 102.

In some example embodiments, the tolerance data 213 may indicate a tolerance level, and for example may indicate a predefined lowest valid page count, which is used in selecting the super blocks from dies of the SSD 100 for garbage collection write operation.

In some example embodiments, the modules 205 of the controller 102 may process the data 215 stored in the memory 104. The modules 205 may be stored within the memory 104. In an example, the modules 205 communicatively coupled to the controller 102 may also be present outside the memory 104 as shown in FIG. 2A and implemented as hardware. As used herein, the term modules 205 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some example embodiments, the modules 205 may include, for example, a generating module 207, an allocating module 209, and other modules 211. The other modules 211 may be used to perform various functions of the controller 102. It will be appreciated that such aforementioned modules 205 may be represented as a single module or a combination of different modules.

The generating module 207 may generate a free block list 106 indicating a plurality of free super blocks. In some example embodiments, the generating module 207 may generate the free block list 106 during at least one of an initialization mode and a power on recovery mode of the SSD. In some example embodiments, each of the plurality of free super blocks are appended sequentially to the free block list 106 upon removing unwanted content or relocating content from a particular super block. In some example embodiments, each of the plurality of free super blocks are appended to the free block list 106 by performing a garbage collection read operation. In some example embodiments, as part of the garbage collection read operation, the generating module 207 may select a super block among the plurality of super blocks, for performing a garbage collection write operation. In some example embodiments, the generating module 207 may select the super block among the plurality of super blocks, based on a tolerance level related to valid page count and based on a die of the SSD to which the super block belongs. For instance, the generating module 207 may select the super block among the plurality of super block for performing the garbage collection write operation, from a die other than a die from which a super block was selected by the garbage collection read operation in a previous cycle. In some example embodiments, the generating module 207 may select the super block from a die which is successive (i.e., sequentially adjacent) to the die from which the super block was selected in the previous cycle. As an example, consider the super block selected by performing garbage collection read operation in the previous cycle is super block 1 from die 0. Therefore, in the current cycle, the super block would be selected from the successive die i.e., from die 1. In some example embodiments, the super block may be selected by performing the garbage collection read operation, from any die of the SSD, other than the dies from which the super blocks were allocated for host write and garbage collection write operations. As an example, consider there are 4 total dies in the SSD i.e., die 0, die 1, die 2 and die 3. Consider, the super block selected for host write is from die 0, super block selected for garbage collection write is from die 2, then for garbage collection read operation, the super block would be selected from any die other than die 0, and die 2 i.e., from die 1 or die 3.

After identifying the die from which the super block should be selected by performing the garbage collection read operation, within the identified die, the generating module 207 may select the super block by performing the garbage collection read operation on the basis of the tolerance level related to valid page count. In some example embodiments, the generating module 207 may determine valid page count of each super block within the identified die, and compare the determined valid page count of each super block within the identified die with a predefined lowest valid page count for a super block. As an example, consider the predefined lowest valid page count is 200 pages for a super block having 200000 pages. In such cases, the tolerance level related to the valid page count is said to be 200. Therefore, based on the comparison, when the valid page count of a super block within the identified die is less than the tolerance level, i.e., when the number of valid pages in the super block is less than the predefined lowest valid page count, then the generating module 207 selects such super block for the garbage collection write operation. In some example embodiments, when there is more than one super block within the identified die, whose valid page count is less than the predefined lowest valid page count, then the generating module 207 may select any one of these super blocks randomly for performing the garbage collection write operation or may select the super block with the least valid pages among the other super blocks whose valid page count is less than the predefined lowest valid page count.

Figure 2B:
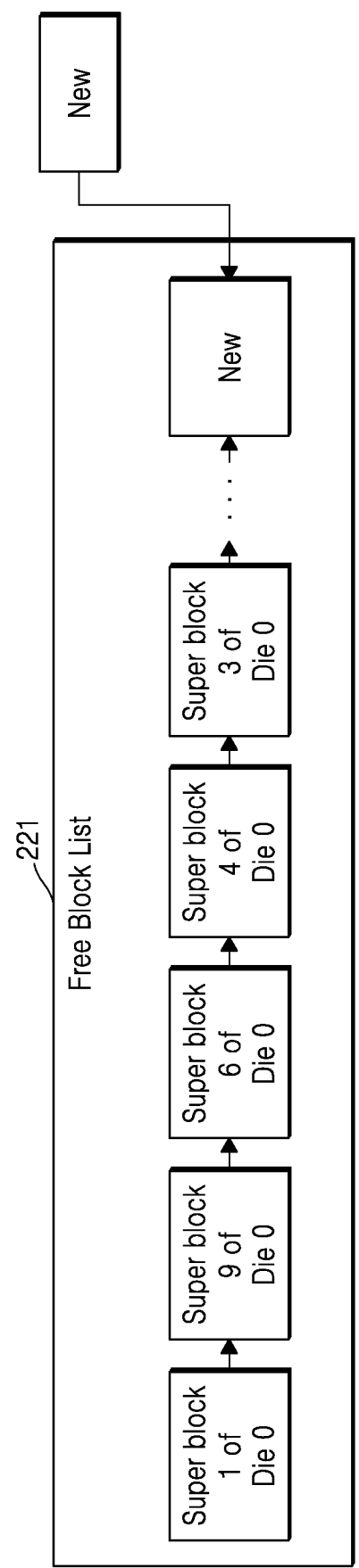
FIG. 2B illustrates a free block list generation as performed in related devices.
Figure 2C:
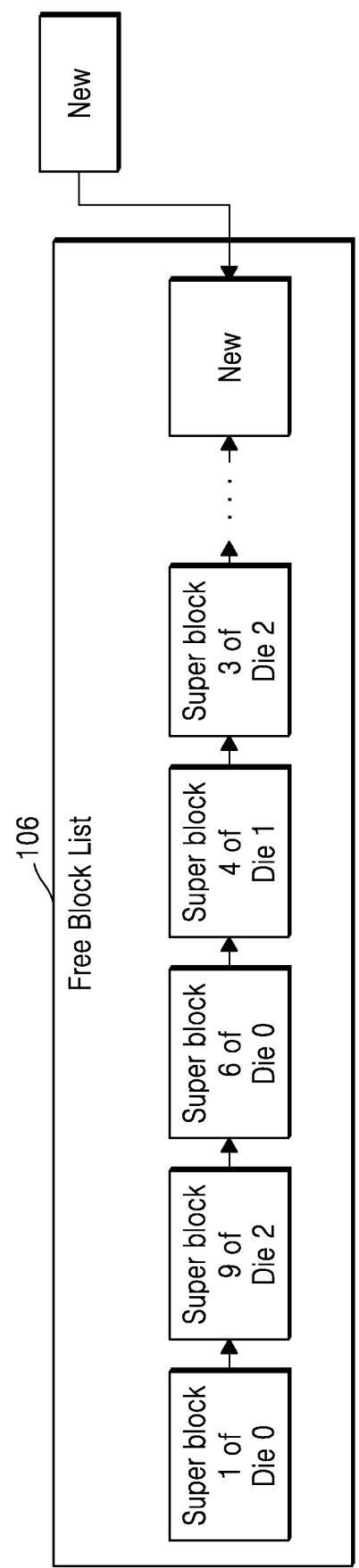
FIGS. 2C and 2D show the free block list generation in accordance with some example embodiments.
Figure 2D:
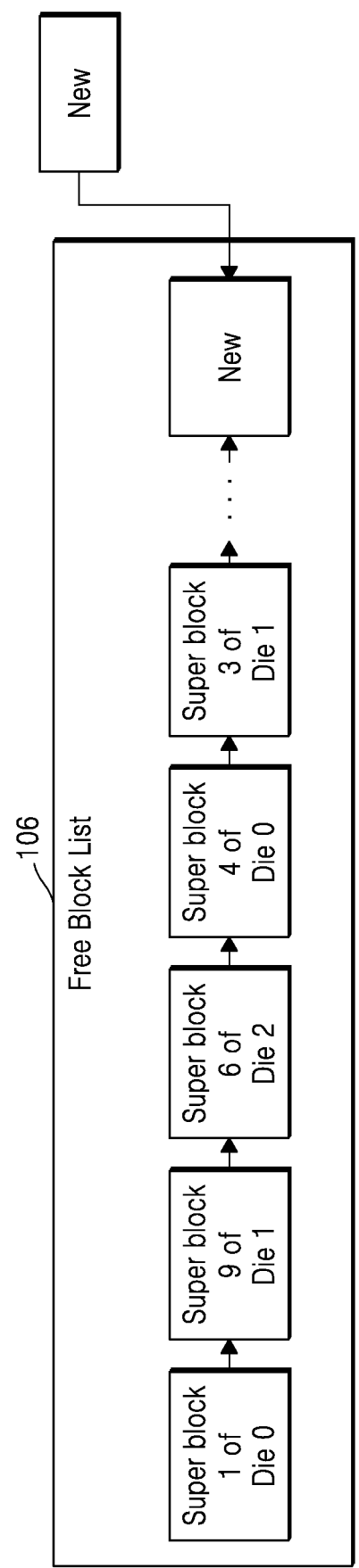

Upon selecting the super block among the plurality of super blocks, for the garbage collection write operation, based on the tolerance level related to the valid page count and die number, i.e., from a die other than a die from which a super block was allocated for the host write or garbage collection write operations, the garbage collection write operation is performed on the selected super block to free the super block. The free super block thus obtained is then appended by the generating module 207 to the free block list. In some example embodiments, appending the free super block to the free block list may include appending number representing the free super block belonging to the identified die to the existing free super block numbers in the free block list. In some example embodiments, since the generating module 207 selects the super block by performing the garbage collection read operation, in a manner different from the existing techniques i.e., based on the tolerance level and the die number as described above, the free super blocks that are appended to the free block list sequentially are from different dies and not from the same die. FIG. 2B shows an arrangement of free super blocks in the exemplary free block list 221 of a related technique. For instance, if there are three dies (namely die 0, die 1 and die 2) including fifty super blocks (namely super block 0, super block 1, super block 2 . . . super block 49), then the free super blocks that are appended sequentially to the free block list 221 are selected from the die 0 until all the super blocks of the die 0 are exhausted, as shown in the FIG. 2B. Thereafter, freeing and appending of the free super blocks continues with the free super blocks in die 1 and so on. However, according to example embodiments, the arrangement of free super blocks in the free block list 106 is as shown in the FIGS. 2C and 2D. According to example embodiments, free super blocks are appended in such a way that it reduces the probability of clashes between the host write operation and garbage collection write operation. In some example embodiments, the plurality of free super blocks appended sequentially to the exemplary free block list 223 are selected from different dies of the plurality of dies. For example, if there are three total dies in the SSD i.e., die 0, die 1 and die 2, free super blocks appended to the free block list are the super blocks selected from different dies, for instance, super block 1 of die 0, followed by super block 9 of die 2, super block 6 of die 0, super block 4 of die 1, super block 3 of die 2, and so on, as shown in the FIG. 2C. In some example embodiments, the plurality of free super blocks appended sequentially to the exemplary free block list 223 are selected from a different die but a successive die of the plurality of dies. For example, if there are three total dies in the SSD i.e., die 0, die 1 and die 2, free super blocks appended to the free block list are the super blocks selected from successive dies i.e., super block 1 of die 0 followed by super block 9 of die 1, super block 6 of die 2, super block 4 of die 0, super block 3 of die 1, and so on as shown in the FIG. 2D. Therefore, by selecting the super blocks for sequentially appending to the exemplary free block list 223, from different dies or successive dies and not the same die, clashes between the host write operation and garbage collection operation may be avoided.

Further, in some example embodiments, when the host write operation or the garbage collection write operation needs to be performed by the SSD 100, the allocating module 209 may allocate a free super block from the plurality of free super blocks in the free block list for each of the host write operation and the garbage collection write operation. In some example embodiments, the allocating module 209 may allocate the free block for each of the host write operation and the garbage collection write operation by following the sequence in which the plurality of free blocks are listed or appended in the free block list. For instance, consider the exemplary free block list 223 as shown in the FIG. 2C. Consider, a host write operation and a garbage collection write operation are scheduled simultaneously. In such a scenario, the allocating module 209 follows the sequence of the exemplary free block list 223 and allocates free super block 1 of die 0 for the host write operation and free super block 9 of die 1 for the garbage collection write operation. If another host write operation is scheduled, the allocating module 209 may then allocate the next free super block in the exemplary free block list 106 i.e., free super block 6 of die 2. This process continues in a similar manner based on the free super blocks appended in the exemplary free block list 223 after each garbage collection read operation.

Figure 3:
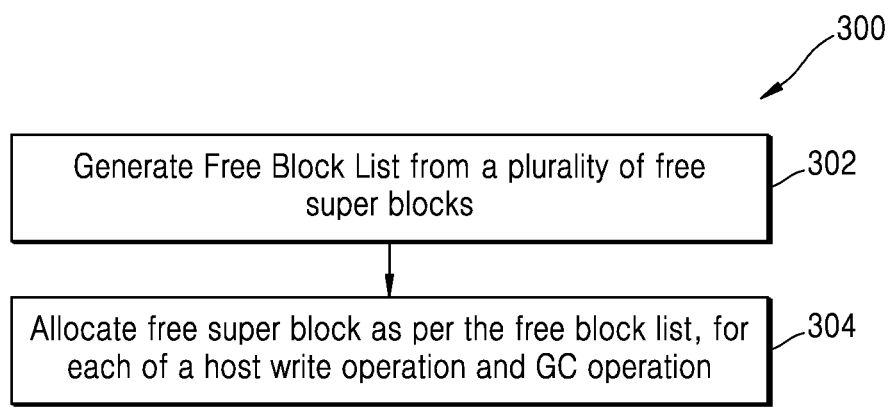
FIG. 3 shows a flowchart illustrating a method for optimizing QoS in accordance with some example embodiments.

FIG. 3 is a flowchart illustrating a method of optimizing Quality of Service (QoS) in SSDs in accordance with some example embodiments.

As illustrated in FIG. 3, the method 300 includes one optimizes Quality of Service (QoS) in SSDs. The method 300 may be described in the general context of computer-executable instructions. Generally, computer-executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At operation 302, the method 300 may include generating, by a controller 102 configured in the SSD 100, a free block list 106 indicating a plurality of free super blocks. In some example embodiments, each of the plurality of free super blocks appended sequentially to the free block list 106 is selected from a different die of a plurality of dies. In some example embodiments, each of the plurality of free super blocks is appended to the free block list 106 by performing a garbage collection read operation. In some example embodiments, as part of the garbage collection read operation, the controller 102 may select a super block among the plurality of super blocks, for garbage collection operation, based on a tolerance level related to valid page count, from a die other than the dies from which the super blocks were allocated for the garbage collection write operation or the host write operation. The controller 102 may generate the free block list 106 during at least one of an initialization mode and a power on recovery mode of the SSD 100.

At operation 304, the method 300 may include allocating, by the controller 102, a free super block from the plurality of free super blocks in the free block list 106 for each of a host write operation and a garbage collection operation.

The method discussed above was implemented and tested on an SSD which has 4 dies per bank. The experiment resulted in improvement of QoS by reducing the latency. QoS for various queue depths and mixed read write distributions such as 100% write, 100% read, 25% read, 50% read, 75% read, which corresponding to stringent and critical requirements for data center SSDs. Experimental results of the implementation were observed to provide a 10% to 22% reduction in 99.99% random read latency and 20% to 39% improvement in random write latency compared to related techniques. In this regard, the time taken (latency) for each read will be different. The experimental result timings were sorted and the maximum 99.99th percentile value was measured.

Figure 4:
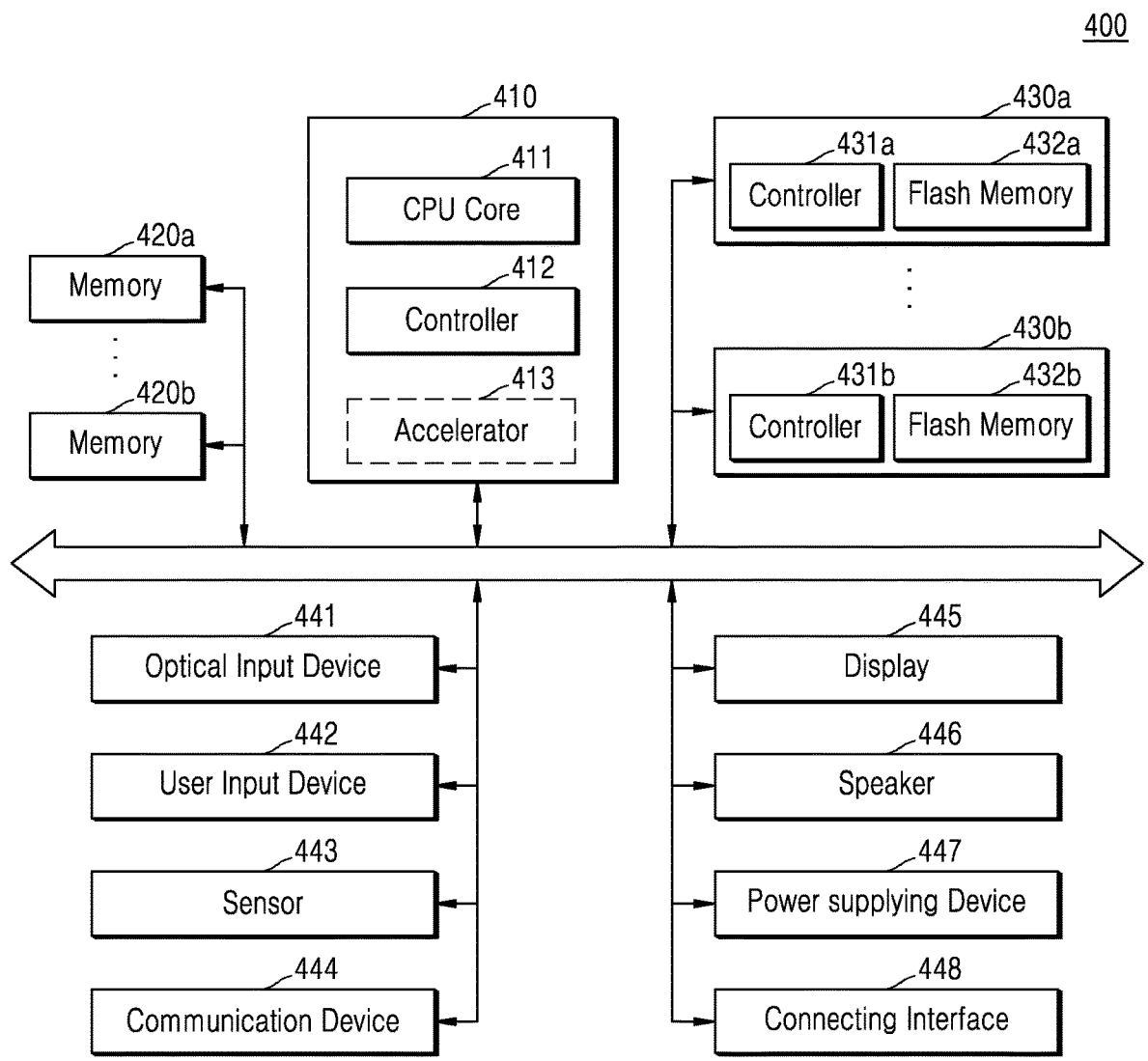
FIG. 4 is a system to which a storage device is applied, in accordance with some example embodiments.

FIG. 4 is an exemplary general diagram of a system 400 to which a storage device is applied, according to some example embodiments. The system 400 of FIG. 4 may be a mobile system, such as a portable communication terminal (e.g., a mobile phone), a smartphone, a tablet personal computer (PC), a wearable device, a healthcare device, or an Internet of things (IOT) device. However, the system 400 of FIG. 4 is not necessarily limited to the mobile system and may be a PC, a laptop computer, a server, a media player, or an automotive device (e.g., a navigation device).

Referring to FIG. 4, the system 400 may include a main processor 410, memories (e.g., 420a and 420b), and storage devices (e.g., 430a and 430b). In addition, the system 400 may include at least one of an optical input device (i.e., an image capturing device) 441, a user input device 442, a sensor 443, a communication device 444, a display 445, a speaker 446, a power supplying device 447, and a connecting interface 448.

The main processor 410 may control operation of the system 400, including operations of other components included in the system 400. The main processor 410 may be implemented as a hardware processor, such as a general-purpose processor, a dedicated processor, or an application processor.

The main processor 410 may include at least one CPU core 411 and further include a controller 412 configured to control the memories 420a and 420b and/or the storage devices 430a and 430b. In some example embodiments, the main processor 410 may further include an accelerator 413, which is a dedicated circuit for a high-speed data operation, such as an artificial intelligence (AI) data operation. The accelerator 413 may include hardware, such as a graphics processing unit (GPU), a neural processing unit (NPU) and/or a data processing unit (DPU), and be implemented as a chip that is physically separate from the other components of the main processor 410.

The memories 420a and 420b may be used as main memory devices of the system 400. Although each of the memories 420a and 420b may include a volatile memory, such as static random access memory (SRAM) and/or dynamic RAM (DRAM), each of the memories 420a and 420b may include non-volatile memory, such as a flash memory, phase-change RAM (PRAM) and/or resistive RAM (RRAM). The memories 420a and 420b may be implemented in the same package as the main processor 410.

The storage devices 430a and 430b may serve as non-volatile storage devices configured to store data regardless of whether power is supplied thereto and have larger storage capacity than the memories 420a and 420b. The storage devices 430a and 430b may respectively include storage controllers 431a and 431b and non-volatile memories (NVMs) 432a and 432b configured to store data via the control of the storage controllers 431a and 431b. Although the NVMs 432a and 432b may include flash memories having a two-dimensional (2D) structure or a three-dimensional (3D) V-NAND structure, the NVMs 432a and 432b may include other types of NVMs, such as PRAM and/or RRAM.

The storage devices 430a and 430b may be physically separated from the main processor 410 and included in the system 400 or implemented in the same package as the main processor 410. In addition, the storage devices 430a and 430b may have types of solid-state devices (SSDs) or memory cards and be removably combined with other components of the system 100 through an interface, such as connecting interface 448 as described below. The storage devices 430a and 430b may be devices to which a standard protocol, such as a universal flash storage (UFS), an embedded multi-media card (eMMC), or a non-volatile memory express (NVMe), is applied, without being limited thereto.

The optical input device 441 may capture still images or moving images. The optical input device 441 may include a camera, a camcorder, and/or a webcam.

The user input device 442 may receive various types of data input by a user of the system 400 and include a touch pad, a keypad, a keyboard, a mouse, and/or a microphone.

The sensor 443 may detect various types of physical quantities, which may be obtained from the outside of the system 400, and convert the detected physical quantities into electric signals. The sensor 443 may include a temperature sensor, a pressure sensor, an illuminance sensor, a position sensor, an acceleration sensor, a biosensor, and/or a gyroscope sensor.

The communication device 444 may transmit and receive signals between other devices outside the system 400 according to various communication protocols. The communication device 444 may include an antenna, a transceiver, and/or a modem.

The display 445 and the speaker 446 may serve as output devices configured to respectively output visual information and auditory information to the user of the system 400.

The power supplying device 447 may appropriately convert power supplied from a battery embedded in the system 400 and/or an external power source, and supply the converted power to each of components of the system 400.

The connecting interface 448 may provide connection between the system 400 and an external device, which is connected to the system 400 and capable of transmitting and receiving data to and from the system 400. The connecting interface 448 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 4394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to example embodiments, a free block list may be generated based on free super blocks that are appended sequentially from a sequential dies of the plurality of dies in the SSD. In this regard, each time a free super block is allocated by following the sequence of the generated free block list, for the host write operation or the garbage collection write operation, the free super block belongs to a different die. For instance, if the free super block 1 is from die 0, then the next free super block in the sequence of the generated free block list would be from a different die. Simultaneously or while the host write operation in ongoing, if the SSD schedules a garbage collection write operation, then the next free super block in the free block list may be allocated. Thus, a clash between the host write operation and garbage collection write operation may be avoided, even though both the operations are scheduled simultaneously or while one of those operations is on-going. Therefore, there exists no need to wait for either of the operations to start until the other on-going operation in the same die ends. This in turn eliminates the latency issues that are encountered in the SSDs due to the clash between the host write operation and garbage collection write operation, thus optimizing the QoS in the SSDs.

While aspects of example embodiments have been particularly shown and described, it will be understood that various changes in form and details may be made therein without departing from the spirit and scope of the following claims.

What is claimed is:

1. A method of operating a solid state drive (SSD), wherein the SSD includes a plurality of channels, each of the plurality of channels includes a plurality of banks, each of the plurality of banks includes a plurality of planes, each of the plurality of planes includes a plurality of dies respectively provided at different levels of die, each of the plurality of dies includes a plurality of blocks, and each of the plurality of blocks includes a plurality of pages, the method comprising:

generating, by a controller provided in the SSD, a free block list indicating a sequence of a plurality of free super blocks, wherein each of the plurality of free super blocks respectively comprises blocks of a particular level across each of the plurality of planes and each of the plurality of banks at a corresponding level of die, and wherein adjacent free super blocks of the sequence of the plurality of free super blocks indicated by the free block list correspond to different levels of die; and allocating, by the controller, a free super block from among the plurality of free super blocks for each of a host write operation and a garbage collection write operation, according to the sequence of the plurality of free super blocks indicated by the free block list.

2. The method as claimed in claim 1, wherein each of the plurality of free super blocks are appended to the free block list by performing a garbage collection read operation, and wherein the garbage collection read operation comprises selecting a super block from among the plurality of free super blocks based on a tolerance level related to a valid page count, from a level of die other than a level of die from which a super block was allocated for the host write operating and the garbage collection write operation.

3. The method as claimed in claim 1, further comprising initializing the SSD, wherein the free block list is generated based on the SSD being initialized.

4. The method as claimed in claim 1, further comprising activating a recovery mode of the SSD, wherein the free block list is generated based on the recovery mode of the SSD being activated.

5. The method as claimed in claim 1, wherein the sequence sequentially indicates a first super block of a first level of die, a second super block of a third level of die, and a third super block of the first level of die.

6. The method as claimed in claim 1, wherein the sequence sequentially indicates a first super block of a first level of die, a second super block of a third level of die, a third super block of the first level of die and a fourth super block of a second level of die.

7. The method as claimed in claim 1, wherein the levels of die comprise a first level of die and a second level of die, and wherein the method further comprises concurrently performing the host write operation with respect to a first super block of the first level of die and the garbage collection write operation with respect to a second super block of the second level of die.

8. A Solid State Drive (SSD) comprising:

a non-volatile memory comprising a plurality of channels, wherein each of the plurality of channels comprises a plurality of banks, each of the plurality of banks comprises a plurality of planes, each of the plurality of planes comprises a plurality of dies respectively provided at different levels of die, each of the plurality of dies comprises a plurality of blocks, and each of the plurality of blocks comprises a plurality of pages;

a controller; and a memory communicatively coupled to the controller, wherein the memory stores instructions, which when executed, are configured to control the controller to:

generate a free block list indicating a sequence of a plurality of free super blocks, wherein each of the plurality of free super blocks respectively comprises blocks of a particular level across each of the plurality of planes and each of the plurality of banks at a corresponding level of die, and wherein adjacent free super blocks of the sequence of the plurality of free super blocks indicated by the free block list correspond to different levels of die; and allocate a free super block from among the plurality of free super blocks for each of a host write operation and a garbage collection write operation, according to the sequence of the plurality of free super blocks indicated by the free block list.

9. The SSD as claimed in claim 8, wherein the instructions are further configured to control the controller to:
append each of the plurality of free super blocks to the free block list, based on a garbage collection read operation,
wherein the garbage collection read operation comprises selecting a super block from among the plurality of free super blocks based on a tolerance level related to a valid page count, from a level of die other than a level of die from which a super block was allocated for the host write operating and the garbage collection write operation.

10. The SSD as claimed in claim 8, wherein the instructions are further configured to control the controller to initialize the SSD and generate the free block list based on the SSD being initialized.

11. The SSD as claimed in claim 8, wherein the instructions are further configured to control the controller to activate a recovery mode of the SSD, and generate the free block list based on the recovery mode being activated.

12. The SSD as claimed in claim 8, wherein the sequence sequentially indicates a first super block of a first level of die, a second super block of a third level of die, and a third super block of the first level of die.

13. The SSD as claimed in claim 8, wherein the sequence sequentially indicates a first super block of a first level of die, a second super block of a third level of die, a third super block of the first level of die and a fourth super block of a second level of die.

14. The SSD as claimed in claim 8, wherein the levels of die comprise a first level of die and a second level of die, and
wherein the instructions are further configured to control the controller to concurrently perform the host write operation with respect to a first super block of the first level of die and the garbage collection operation with respect to a second super block of the second level of die.

15. A non-transitory computer readable storage medium storing instructions that when executed by a processor of a solid state drive (SSD) which includes a plurality of channels, each of the plurality of channels includes a plurality of banks, each of the plurality of banks includes a plurality of planes, each of the plurality of planes includes a plurality of dies respectively provided at different levels of die, each of the plurality of dies includes a plurality of blocks, and each of the plurality of blocks includes a plurality of pages, cause the SSD to:
generate a free block list indicating a sequence of a plurality of free super blocks, wherein each of the plurality of free super blocks respectively comprises blocks of a particular level across each of the plurality of planes and each of the plurality of banks at a corresponding level of die, and wherein adjacent free super blocks of the sequence of the plurality of free super blocks indicated by the free block list correspond to different levels of die; and
allocate a free super block from among the plurality of free super blocks for each of a host write operation and a garbage collection write operation, according to the sequence of the plurality of free super blocks indicated by the free block list.

16. The non-transitory computer readable storage medium as claimed in claim 15, wherein the instructions, when executed by the processor, are further configured to cause the SSD to:
perform a garbage collection read operation; and
append each of the plurality of free super blocks to the free block list based on the garbage collection read operation, and
wherein the garbage collection read operation comprises selecting a super block from among the plurality of free super blocks based on a tolerance level related to a valid page count, from a level of die other than a level of die from which a super block was allocated for the host write operating and the garbage collection write operation.

17. The non-transitory computer readable storage medium as claimed in claim 15, wherein the instructions, when executed by the processor, are further configured to cause the SSD to:
initialize the SSD; and
generate the free block list based on the SSD being initialized.

18. The non-transitory computer readable storage medium as claimed in claim 15, wherein the instructions, when executed by the processor, are further configured to cause the SSD to:
activate a recovery mode of the SSD; and
generate the free block list based on the recovery mode being activated.

* * * * *